June 3, 1952  P. E. FEHR  2,598,899
MAXIMUM DEMAND METER FOR PULSATING LOADS
Filed July 29, 1948

INVENTOR:
PAUL E. FEHR
BY Morgan, Finnegan & Durham
ATTORNEYS.

Patented June 3, 1952

2,598,899

UNITED STATES PATENT OFFICE 2,598,899

MAXIMUM DEMAND METER FOR PULSATING LOADS

Paul E. Fehr, Zug, Switzerland, assignor to Landis & Gyr, A. G., Zug, Switzerland, a corporation of Switzerland Application July 29, 1948, Serial No. 41,317
In Switzerland August 5, 1947

8 Claims. (Cl. 171—34)

This invention relates to a maximum demand meter and more particularly to a meter for indicating over a plurality of predetermined time periods the mean power which has been consumed during the period of maximum demand.

Objects and advantages of the invention will be set forth in part hereinafter and in part will be obvious herefrom or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention and, together with the description, serve to explain the principles of the invention.

Figure 1:
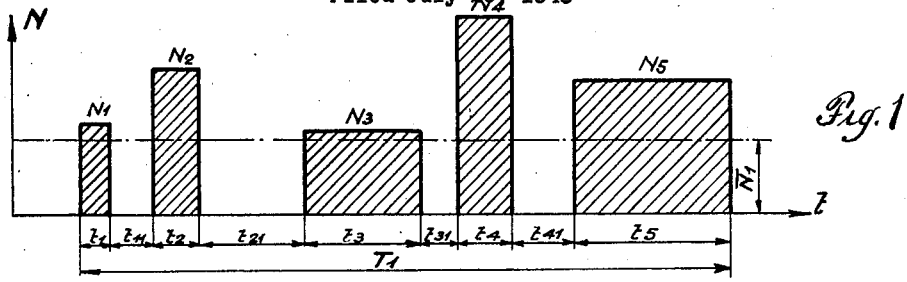
Fig. 1 is a diagram showing a typical relationship of power consumption with respect to time over a given period of time.

An object of the subject invention is to provide a meter which will indicate the mean consumption of power during a predetermined period of time.

Another object of the subject invention is to provide a meter in which a pointer indicating power consumption will be returned to zero after a predetermined period of time.

A further object of this invention is to provide a meter in which the period of time for measuring power consumption includes only those intervals in which power is actually being consumed and not those periods in which the equipment whose power consumption is being measured is idle.

Still another object of the subject invention is to provide a meter which will measure the power consumption over a plurality of predetermined time periods and will indicate the mean value of power during that period in which maximum power consumption occurs.

Equipments such as arc welding plants and spot welding plants consume power in spurts. In order to determine the size of power supplied equipment which must be used in conjunction with these intermittently pulsating devices, it is necessary to determine the mean power consumption over a plurality of predetermined time periods. The power supply equipment is then designed from the viewpoint of the mean power consumption during the period of maximum power demand. One difficulty with meters now in use is that they include in a measuring period those intervals in which no power is being consumed as well as those intervals of power consumption. This causes a lower mean value to be obtained than if the idle intervals were excluded and only those intervals in which power were actually consumed were used as the measuring basis. Furthermore, this lower mean value is not a true indication of the mean power required during those times when the pulsating device is being used.

The subject device includes in a measuring period only those intervals in which power is actually consumed. The device actually measures the total power consumed during each measuring period, but since the dial face is calibrated on the basis of the amount of time comprising the time period, the reading is a direct indication of the mean power consumed during the period. The reading is made by a pointer which is loosely coupled to a shaft and this pointer is moved by a second pointer which is rigidly coupled to the shaft. The shaft is in turn coupled by a gear train to a disc which is rotated when power is being consumed at a rotational speed dependent upon the rate of power supplied. The rigidly coupled pointer is therefore rotated during the measuring period over an angle dependent upon the total power used during the period, carrying the loosely coupled pointer with it. The gear train is then decoupled and the rigid pointer is returned to its zero position by a spring coupled to its shaft. Another period then begins. The loosely coupled pointer is not moved from its maximum position of the previous period unless the total power consumption of this new period exceeds that of the previous period, in which case the pointer will be moved ahead by the amount of the power increase. After a plurality of such time periods the loosely coupled pointer may be manually returned to zero.

As has been previously explained, the measuring period is made up only of those intervals in which power is actually consumed. This is effectuated by means of a brake lever which engages the teeth of a gear rigidly coupled to a measuring cam. When power is consumed, the brake is attracted by means of an induction coil in the power circuit, releasing the above-mentioned gear and pinioning a second gear which is rigidly coupled by a common shaft to the planet wheel of a differential gearing system. Since the shaft cannot rotate, the planet wheel must rotate about its own axis and turn a sun wheel which is rigidly coupled to the measuring cam. After rotating for a predetermined angle, corresponding to five or ten minutes, for example, the cam closes a switch controlling the actuation of a relay. Actuation of the relay in turn causes the rigidly coupled pointer which indicates the total power consumption during the period to be released, and a new measuring period now starts.

It will be understood that the foregoing general description and the following detailed description as well are exemplary and explanatory of the invention but are not restrictive thereof.

Referring now in detail to the accompanying drawing and especially to Fig. 1 therein, a typical load diagram for a pulsating load is shown. As may be readily understood from the fact that the pulsating equipment is not continuously used, the load intervals $t_1$, $t_2$, etc., are separated by the idle intervals $t_{11}$, $t_{21}$, etc., these intervals being spaced along the horizontal axis to form a period $T_1$ of predetermined time length. The vertical axis shows by means of the numerals $N_1$, $N_2$, etc., the power consumed during those intervals when the pulsating equipment is being used. Since the total amount of energy $W_1$ consumed during the period $T_1$ is the summation of the power multiplied by the time at each instance during the period, $$W_1 = \Sigma N_1 t_1 + \Sigma N_2 t_2 + \Sigma N_3 t_3 + \ldots = \Sigma N_m t_m$$

where $m$ is the total number of current conducting intervals during the period $T_2$. The recording period consists of the following intervals of time:

$$T_1 = t_1 + t_{11} + t_2 + t_{21} + \ldots = \Sigma(t_m + t_{m1})$$

The mean load during the particular period would be $$\overline{N}_1 = \frac{W_1}{T_1} = \frac{\Sigma N_m t_m}{\Sigma t_m + t_{m1}}$$

As may be seen, the means power value is dependent upon the intervals $t_{m1}$ which occur between those times in which a load is being carried by the equipment. Because of these idle intervals, the mean value $\overline{N}_1$ is lower than it would be if only the load intervals $t_m$ were considered. Furthermore, the amount of power used during the load intervals might be increased without increasing the mean value $\overline{N}_1$ if the idle intervals between the load intervals were lengthened.

Figure 2:
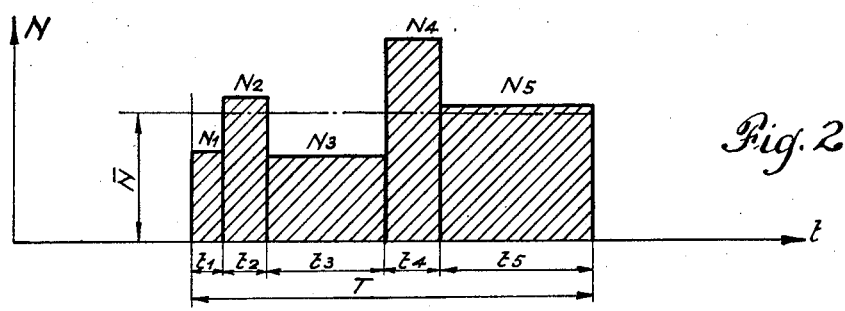
Fig. 2 is a diagram showing how the subject invention operates to include only those intervals in which power is being consumed without including the intermediate intervals of idleness; and, Fig. 3 is a schematic diagram of the electrical and mechanical components which form the subject invention.

Fig. 2 shows a load diagram in which the idle intermediate intervals of Fig. 1 are eliminated by the subject invention. Thus, the recording interval T is composed only of those intervals in which a load is applied to the pulsating equipment and $$T = t_1 + t_2 + \ldots t_m = \Sigma t_m$$

The total amount of energy is the same as in Fig. 1:

$$W = N_1 t_1 + N_2 t_2 + \ldots N_m t_m = \Sigma N_m t_m$$

But the mean power is indicated by the relationship $$\overline{N} = \frac{W}{T} = \frac{\Sigma N_m t_m}{\Sigma t_m}$$

As may be seen, the mean power value here is greater than that obtained from the relationship of Fig. 1 and this value gives a truer indication of the mean power which is consumed during those intervals when a load is applied. The period $T_1$ may have any predetermined value, such as 5, 10 or 15 minutes, for example. Its end is reached in each case when the sum of the times $t_m$ during which there is a load becomes equal to the value set for the period.

Figure 3:
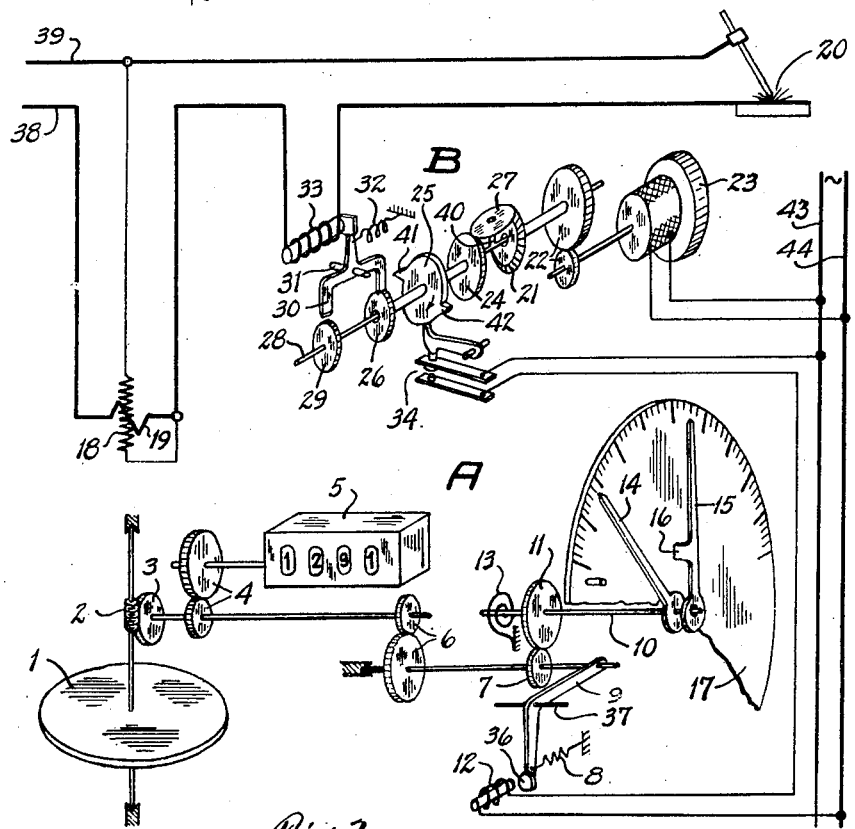

The means for carrying out the proposed measurements are shown in Fig. 3. In this figure, A denotes a maximum demand meter of a normal design, consisting of a driving disc 1, a worm 2, a worm-wheel 3, gears 4 for driving a counting mechanism 5 and transmission gearing 6 for driving a gear wheel 7 forming one member of a coupling 7, 11. The wheel 7 is maintained in engaged relationship with the gear wheel 11, which is rigidly mounted on a pointer shaft 10, by means of a bell-crank lever 9 acted on by a spring 8. The bell crank has a magnetic face 36 at its bottom such that the lever can be attracted when a relay 12 is actuated. When this attraction occurs, the bell crank lever rotates about a shaft 37 and causes the toothed wheels 7 and 11 to become disengaged from each other. A spiral spring 13 then turns the pointer shaft 10 in a counter-clockwise direction back to its starting position. A pointer 14 is rigidly mounted on the right end of the shaft 10 while an idle pointer 15 having a tab 16 projecting therefrom is loosely coupled to the shaft. The tab permits the pointer 14 to move the pointer 15 through pressure on the tab when the pointer 14 is rotated by the action of the previously described gear trains. Even after the return of the pointer 14 to its zero position at the end of the predetermined time period, the pointer 15 will continue to maintain its position of maximum reading because of its loose coupling with the shaft and because of its friction with parts of the meter casing. The two pointers move in front of a scale 17, which will be further described hereinafter. The driving disc 1 and the pointer 14 are set into rotation by a driving system of conventional construction. This system consists of a voltage coil 18 connected in parallel with the power input leads 38 and 39, and a current coil 19 in series with the lead 38, rotation being proportional to the load on the driving system. The unit causing the pulsating load in Fig. 3 may be any one of a variety of different devices, with an electric welding apparatus 20 being shown by way of example.

The letter B represents a timer for measuring the predetermined period of time over which the mean power is taken. This timer comprises a set of differential gears, one of whose sun wheels 21 is continuously driven through transmission gear 22 by a synchronous motor 23. The other sun wheel 24 is connected with a cam disc 25 and a brake wheel 26. A further brake wheel 29 is provided on the differential shaft 28 and a planet wheel 27 is also fastened to this shaft by means of the shaft 40, the teeth of the planet wheel meshing with those of the sun wheels 21 and 24. The two brake wheels 26 and 29 act in conjunction with a brake lever 30, which is mounted to turn about a shaft 31 and is capable of stopping alternately one of the two brake wheels by engaging the teeth in the wheel peripheries. In the position of rest, the brake lever is rocked backwards by a resetting spring 32 so as to brake the wheel 26, as shown in Fig. 3. As a result, the cam disc 25 comes to a standstill because of the fact that it, as well as the sun wheel 24, is rigidly coupled to the gear 26. With the gear 26 blocked, the planet wheel 27 and the brake wheel 29 will turn with the shaft 28 when the sun wheel 21 is driven by the synchronous motor 23 in a counter-clockwise direction.

Cooperating with the brake lever 30 is an electromagnet 33, which is arranged opposite the brake lever such that it can overcome the action of the spring 32 and rock the lever in a counter-clockwise direction. This causes the brake wheel 26 to be freed and the brake wheel 29 to be held. Since the planet wheel 27 and the brake wheel 29 are attached to the shaft 28, the locking of the brake wheel prevents the planet wheel from rotating the shaft 28. The planet wheel now only turns about its own axis and drives the sun wheel 24 and the cam disc 25 in a clockwise direction. The turning of the cam disc 25 in each case lasts only as long as the electromagnet 33 remains energized or, in other words, only for the duration of $t_m$ of a load pulse. The cam disc thus turns during the interval $t_m$ through an angle $a_m$. Conditions may be so chosen that the sum of the angles of rotation corresponding to the sum of all the load intervals making up a time period amounts to exactly 180°. Thus $$t_1 + t_2 + \ldots t_m = T$$
$$a_1 + a_2 + \ldots a_m = 180°$$

If a rotational angle of 180° is chosen, the cam disc 25 is provided with two diametrically opposite projections 41 and 42, respectively, each of which acts to close a contact 34 for a short time. Since the contact 34 is connected in series with the relay 12 and with power leads 43 and 44, which may be identical with the leads 38 and 39, respectively, the relay 12 will be actuated upon the closing of the contact 34. Actuation of the relay 12 causes the bell bell crank lever 9 to rotate about the shaft 37 and release the gear 7 from engagement with the gear 11, with the result that the spring 13 returns the pointer 14 to its zero position.

The method of operation of the arrangement described is as follows: With each load pulse, the driving disc 1 is caused to rotate and on the one hand moves the counting mechanism 5 forward by the corresponding amount of energy, while on the other hand the maximum pointer 14 turns clockwise through a corresponding angle. At the same time the cam disc 25 of the timer B also turns through an angle proportional to the length of time $t_m$. These processes are repeated for each load pulse until the sum of the angles traversed by the cam disc is, for example, 180°, at which time a particular measuring period is completed. When this happens, the contact 34 is closed for a brief interval and the pointer 14 is returned to its zero position by the action of the sprial spring 13. The idle pointer 15 remains in the maximum position attained by the pointer 14 because of the fact that it is loosely coupled to the shaft 10. This process is repeated over and over again. After a number of measuring periods have passed, such as, for example, the duration of a month, the idle pointer indicates the amount of power which was used up during the period of maximum power consumption. At the end of the month, the pointer is returned manually or by suitable automatically operating equipment to its zero position and a new measurement is commenced.

As has been previously explained, the pointers 14 and 15 give a power measurement by moving in front of the scale 17. Since the pointer 14 is rotated only when power is being consumed, it can give a direct indication of the total power required during any measuring period if the scale is calibrated properly. But the scale can also give a reading of the mean power consumed during any measuring period if the calibration is made on the basis of dividing the power by the length of the measuring period. For the purposes of this invention, the latter calibration is preferable.

The timer B can obviously be constructed without the use of any differential gears. For example, the cam disc 25 can be driven directly by the synchronous motor. The latter would then be constantly under pressure but would only be released by the electromagnet 33 during those intervals when there is a load. Moreover, the cam disc 25 can also be driven by a step-by-step feed mechanism having a predetermined feed frequency, which would be switched on by the electromagnet 33 during each of the load pulses. The essential feature of the new device is only the summation of the times $t_m$ of pulsating load, in order to build up the value of the selected recording period T, upon which the relay 12 is energized for a short time on each occasion.

The invention in its broader aspects is not limited to the specific mechanisms shown and described but departures may be made therefrom within the scope of the accompanying claims without departing from the principles of the invention and without sacrificing its chief advantages.

What is claimed is:

1. In a meter for indicating the mean value of pulsating loads for a recording period of maximum power consumption, a first gear, a second gear concentric with said first gear, a cam rigidly coupled to said first gear, a bell crank lever having a first arm engageable with said first gear and a second arm engageable with said second gear, means for normally retaining said lever in engagement with said first gear so as to restrain the movement of said gear, means operable during the load intervals for pivoting said lever so as to restrain said second gear and cause said first gear to rotate during said load intervals, an indicating element rotatable in proportion to the amount of power consumed, and means for releasing said indicating element to its zero position after the rotation of said cam through a predetermined angle.

2. In a meter for indicating the mean power value for a period of power consumption, a first sun wheel, a second sun wheel and a planet wheel rigidly secured to a shaft concentric with said sun wheels, a cam rigidly coupled to said second sun wheel, means for rotating said planet wheel about its secured shaft and for blocking the rotation of said second sun wheel during the intervals in which no power is required, means for rotating said planet wheel about its own axis and for releasing said second sun wheel for rotation during said intervals of power consumption, a pointer driven in accordance with power demand, and means actuated by said cam for restoring said pointer to its original position after a predetermined period of power consumption.

3. A meter for reading the mean power value during a plurality of successive measuring periods and recording the mean power value for the period of maximum power consumption, comprising in combination, a first indicating element driven periodically in accordance with demand, a second indicating element loosely coupled to said first element so as to be driven by said first element, a set of differential gears, a timer element driving one of the differential gears, a cam driven by another of said differential gears, and means released by consumption of power for normally holding another gear of said set against rotation, whereby the cam is rotated only during periods of power consumption, and electromagnetic means actuated by said cam at the end of each recording period for releasing said first indicating element whereby it may return to zero.

4. A meter for reading the mean power value during a plurality of successive measuring periods and recording the mean power value for the period of maximum power consumption, comprising in combination, a first indicating element driven periodically in accordance with demand, a second indicating element loosely coupled to said first element so as to be driven by said first element, a set of differential gears comprising a planet wheel and a pair of sun wheels, a cam fixedly attached to one of said sun wheels, means for preventing said sun wheel from rotating during intervals of no power consumption, means for rotating said wheel during intervals of power consumption so as to measure the length of said intervals, and electromagnetic means actuated at the end of each recording period to release said first indicating element.

5. A meter for indicating the mean value of pulsating loads over a recording period comprising in combination a demand element driven in accordance with power consumption and means for releasing and resetting said element to zero upon the termination of a recording period including a timer driven only during load intervals, a switch actuated when the sum of the load intervals equals the recording period, said switch controlling the release and resetting of said element.

6. A meter as claimed in claim 5 in which the switch is actuated from the timer through differential gearing one gear of which is driven by a timing motor, another gear of which is restrained during load intervals and the other gear of which is driven only during load intervals, said other gear driving a cam which actuates the switch to close it.

7. A meter as claimed in claim 5 in which is provided a first sun wheel, a second sun wheel and a planet wheel meshing with the sun wheels, two of the wheels being controlled by the load so that one of them is stopped during load intervals and one of them drives a switch closing cam during load intervals, the third wheel being constantly driven by the timer.

8. A meter as claimed in claim 5 in which a second indicating element is provided driven by the demand element and frictionally held against return of the demand element.

PAUL E. FEHR.

REFERENCES CITED

The following references are of record in the file of this patent:

UNITED STATES PATENTS

| Number | Name | Date |
|---|---|---|
| 725,708 | Holden | Apr. 21, 1903 |
| 1,163,226 | Evans et al. | Dec. 7, 1915 |
| 1,990,417 | Page | Feb. 5, 1935 |

FOREIGN PATENTS

| Number | Country | Date |
|---|---|---|
| 478,091 | Great Britain | Jan. 12, 1938 |